United States Patent [19]
Wilmott et al.

[11] Patent Number: 6,047,296
[45] Date of Patent: Apr. 4, 2000

[54] COMPREHENSIVE METHOD OF RESOLVING NESTED FORWARD REFERENCES IN ELECTRONIC DATA STREAMS WITHIN DEFINED RESOLUTION SCOPES

[75] Inventors: Sam Wilmott, Ottawa; Norbert Winklareth, Aylmer; Eric Promislow, Ottawa; Habib Khalfallah, Ottawa; Roy Amodeo, Ottawa; Omar Essa, Nepean, all of Canada; Klaus Harbo, Birkerod, Denmark

[73] Assignee: Omnimark Technologies Corporation, Ottawa, Canada

[21] Appl. No.: 08/762,221

[22] Filed: Dec. 9, 1996

[51] Int. Cl.$^7$ .................................................. G06F 17/21
[52] U.S. Cl. .................. 707/513; 707/500; 707/530; 707/540
[58] Field of Search .................... 707/511, 512, 707/539, 540, 513

[56] References Cited

U.S. PATENT DOCUMENTS

| | | | |
|---|---|---|---|
| 4,800,485 | 1/1989 | Ackroff et al. | 364/200 |
| 4,864,497 | 9/1989 | Lowry et al. | 364/300 |
| 5,142,662 | 8/1992 | Gump et al. | 395/100 |
| 5,291,602 | 3/1994 | Barker et al. | 395/700 |
| 5,537,526 | 7/1996 | Anderson et al. | 395/148 |
| 5,557,722 | 9/1996 | DeRose et al. | 395/148 |
| 5,581,760 | 12/1996 | Atkinson et al. | 395/700 |
| 5,655,130 | 8/1997 | Dodge et al. | 395/772 |
| 5,659,676 | 8/1997 | Redpath | 395/777 |
| 5,727,220 | 3/1998 | Hohensee et al. | 395/774 |
| 5,729,751 | 3/1998 | Schoolcraft | 395/792 |
| 5,764,241 | 6/1998 | Elliott et al. | 345/473 |
| 5,778,368 | 7/1998 | Hogan et al. | 707/10 |
| 5,892,900 | 4/1999 | Ginter et al. | 395/186 |

OTHER PUBLICATIONS

"Exoterica and AIS update SGML tools", Seybold Report on Publishing Systems, v25, n14, p28(2), Apr. 1996.

John R. McFadden, "Letter to the Editor", Seybold Report on Publishing Systems, v23, n14, p31(1), Apr. 1994.

M. Walter and G. Alexander, "Status report on SGML: notes from SGML '93", Seybold Report on Publishing Systems, v23, n9, p3(11), Jan. 1994.

"Imprinta and Seybold showcase, part III: authoring, managing, producing text", Seybold Report on Publishing Systems, v21, n14, p3(32), Apr. 1992.

S. Lippman, "C++ Primer", AT&T Bell Laboratories (pp. 133–135, 356–367), 1993.

*Primary Examiner*—Joseph H. Feild
*Assistant Examiner*—Robert D Bourque
*Attorney, Agent, or Firm*—Gordon Freedman; Neil Teitelbaum

[57] ABSTRACT

A system and method for constructing documents has files containing data and instructions. The data forms logical streams for provision to output means. According to the method, a plurality of referents referring to logical streams of data are provided. A plurality of different referent scopes with which referents are associated and used and outside of which referents within a scope are inaccessible are also provided. Referents are then inserted into the logical stream of data and within a referent scope from the plurality of referent scopes. The logical streams of data referred to by referents within a referent scope are then resolved but resolving of a referent scope does not necessarily result in a resolved logical stream of data absent referents. Once the referent scopes are resolved, the resulting logical data stream is provided to the output device as a constructed document. A system having parts for performing the steps of the method is also disclosed.

13 Claims, 9 Drawing Sheets

```
                12
Open Stream s as File "document.txt"           10              11
                                                ⊂━━━━⊃─ Document.txt
                                                   s
Put s "hello"  13                              hello        10a Put s Referent "A"  14                         hello  ☐     10b Put s "world"  15                              hello  ☐ world  10c 22
Open stream t as Referent "A"                  20 ⊂━━━━⊃─ Referent "A"
                                                    t
Put t " "  24i                                 ─────────────

Put t "wonderful"  24ii                        wonderful
Put t " "  24iii
                                               wonderful Resolve t  25              wonderful           ─ Referent "A"
                                                    ☐

Resolve s             hello wonderful world ─ Document.txt 11b
```

Fig. 3

Prior Art

COMPREHENSIVE METHOD OF RESOLVING NESTED FORWARD REFERENCES IN ELECTRONIC DATA STREAMS WITHIN DEFINED RESOLUTION SCOPES

FIELD OF THE INVENTION

This invention relates generally to electronic documents and more particularly to a method of constructing electronic documents.

BACKGROUND OF THE INVENTION

In the past, complex documents were assembled by hand from a variety of sources. The assembly of these documents required the frequent publication of errata, addenda, and new volumes. Even the newest volumes of some documents were soon no longer current.

With the advent of computers and electronic publication, it was believed that all of this was a thing of the past. Using "cut" and "paste" operations, electronic copies of documents could be assembled rapidly and could reflect up to the minute information. Tools were developed to support these efforts by importing several document parts into a single document for publication. These features, known as "import" or "publish and subscribe" have become quite common.

Unfortunately, the problems of paper document assembly still exist. Each electronic document is only as current as the time it was generated. Therefore, the time between generation of individual parts and generation of the whole, as well as any time since generation of the document renders information "stale." Each part of the finished document must be constructed in advance and stored in a predetermined location in order to ensure correct electronic document construction. The administration of a document construction process requires communications with all parties and schedule management.

In U.S. Pat. No. 5,530,852 in the name of Meske, Jr. Et al., a method of extracting profiles and topics from files and generating indices thereof is disclosed. The method disclosed relies on natural language parsing and automatically generates some electronic documents for improving information access and ease of use. Unfortunately, the method constructs a file in dependence upon other existing files and therefore, suffers from some of the limitations outlined above. Methods for searching existing files in order to construct a complete document, a table of contents, or an index is known. These methods are very useful in an age where information changes periodically and where these changes can be measured in months or years. Unfortunately, as change increases, these same methods become less applicable to newly arising problems.

In contrast, existing document construction software, an example of which is Omnimark® V.1, allow for document assembly in the known fashion described above. Omnimark® V.1, however, provides document assembly of existing documents. When an included document is not present or requires construction, an error is reported.

OBJECT OF THE INVENTION

In an attempt to overcome these and other limitations of the prior art, it is an object of the present invention to provide a method of constructing electronic documents that are more current and less dependent on previously constructed other documents.

It is an object of the present invention to provide a method of constructing electronic documents that requires less administrative and scheduling effort.

It is an object of the present invention to provide a method of document construction that is compatible with transaction processing and document server applications.

It is a further object of the present invention to provide a method of document construction for constructing a plurality of documents with different formats from a same set of data. These documents may, for example, be in formats suitable to different countries, operating systems, organisations, web browsers, etc.

SUMMARY OF THE INVENTION

In accordance with the invention, there is provided a document construction system including files containing data and instructions, wherein data forms at least a logical stream of data and wherein logical streams are provided to output means. The system comprises:

means for providing a plurality of referents wherein at least a referent refers to a logical stream of data;

means for providing a plurality of different referent scopes with which referents are associated and used and outside of which referents within a scope are inaccessible;

means for inserting at least a referent into the logical stream and within a referent scope from the plurality of referent scopes; and means for resolving logical streams of data referred to by referents within a referent scope.

In accordance with another aspect of the invention, a method of document construction is provided, comprising:

providing a plurality of logical streams of data;

providing a plurality of referents wherein a referent refers to a logical stream of data from the plurality of logical streams of data;

providing a plurality of different referent scopes with which referents are associated, within which referents within said scope are used and outside of which referents within said scope are inaccessible;

inserting at least a referent into a logical stream of data from the plurality of logical streams of data and within a referent scope from the plurality of different referent scopes; and resolving logical streams of data referred to by referents within a referent scope.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
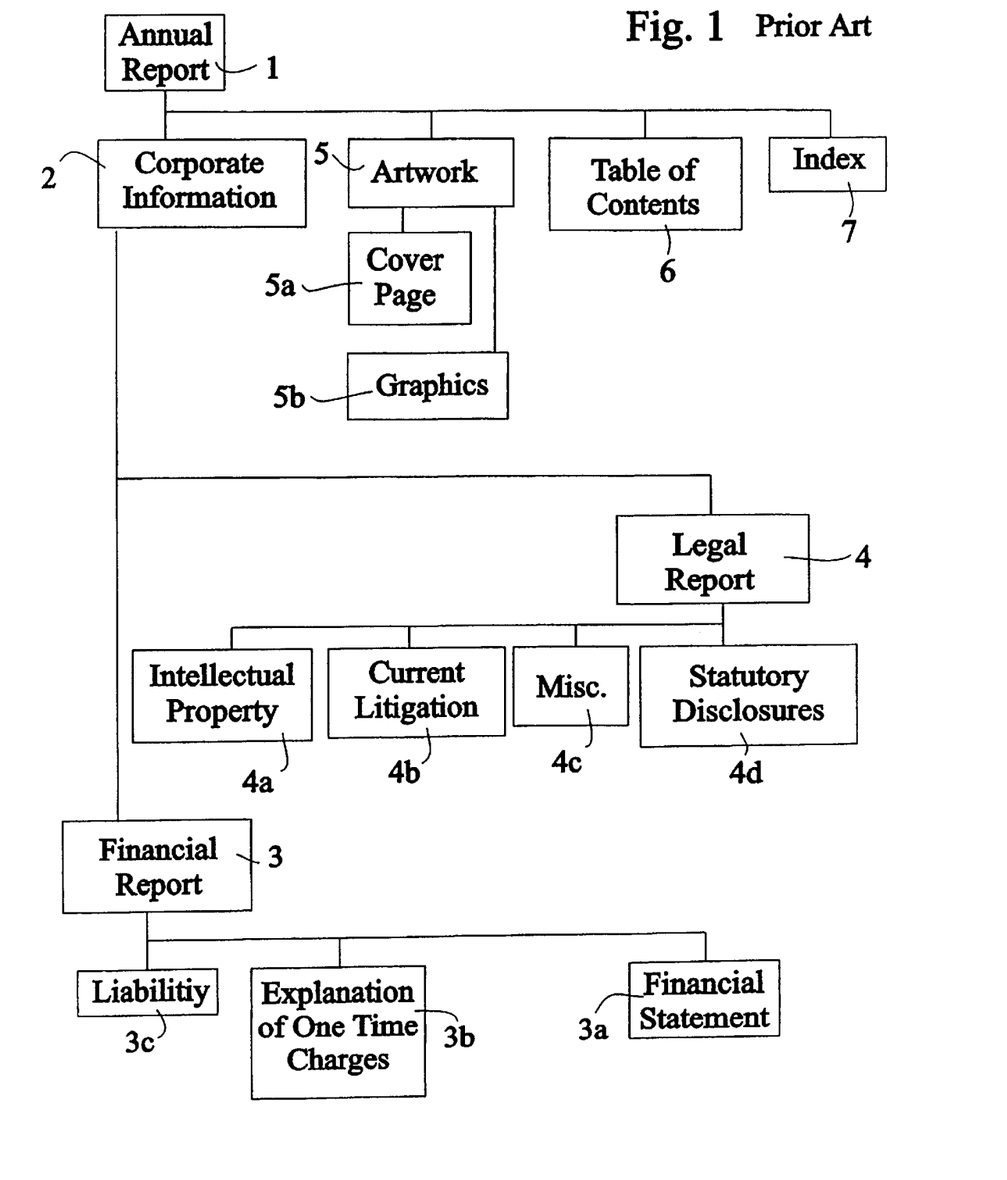
FIG. 1 is a simplified block diagram of a document construction process according to the prior art.

Referring to FIG. 1, a block diagram of document parts and document construction is shown for an annual report. Annual reports often comprise a booklet containing professional artwork, a table of contents, and corporate information for potential and existing shareholders. An automated construction system for an annual report 1 and according to the prior art uses existing status reports from different groups in a corporation to assemble the annual report 1.

A legal department produces a legal report 4. The legal report is comprised of an intellectual property report 4a, a report regarding current litigation and potential litigation 4b, a miscellaneous issues report 4c, and disclosures required by law 4d. A finance department produces a financial report 3. The financial report comprises a financial statement 3a, a liability status 3c, and an explanation of one-time charges 3b. Optionally, the financial statement includes financial statements from a plurality of business units.

Departments produce status reports on their activities. These reports, not shown in FIG. 1, are incorporated with graphics 5b into the annual report 1. For example, a strategic planning department produces a report on corporate vision and corporate thrusts. This report comprises new areas of research and development and new product offerings from a plurality of business units. Also, a report from each business unit outlining achievements, new products and significant research and development efforts are produced.

In order to construct the annual report 1, the reports produced by groups, within the corporation, are assembled into one document. A cover page 5a, a table of contents 6, and an index 7 are added. Artwork 5 is incorporated into the document, as desired, to produce a professional quality annual report 1.

An alternative document construction process according to the prior art and not shown uses a document template for construction of a document. At insertion points within the template, information received from a source is inserted. The information forms a part of the overall document. Optionally, information of this type includes statistics, poll results, weather, dates, times, phone numbers, or other information stored and accessible through data mining or data base access.

During construction, the template is parsed for insertion points and at these points, the information for insertion is retrieved and inserted. The retrieval occurs when the document construction occurs. Alternatively, the information retrieval is performed in advance and the information is stored in a file. Files of this nature are often referred to as "merge files."

Referents

In electronic document construction, a referent is a place holder within a document or stream of data. The place holder, or referent, is defined during a document construction process. Defining a referent comprises initialising the referent, associating the referent with a stream of data or file, and placing information within the associated stream or file. Alternatively, the referent refers to information of a known size in the form of a string of characters, a number, a date, a time, etc. Further alternatively, the referent refers to another form of data structure. Optionally, during the initialisation process, a default value is provided to the referent, the default value to be used when a referent is not completely defined.

Referents are resolved at a point in time. This is affected through a resolution instruction. Execution of the instruction causes a resolution of referents. When a referent definition exists, the resolution process replaces the place holder or referent within the stream of data with the referent definition established. Alternatively, when no referent definition is established and a default referent definition exists, the place holder in the stream is replaced by the default definition. Further alternatively, when no default referent definition and no referent definition exist for a referent, an error condition is reported. Optionally, the error condition reporting system allows for correction of the error condition.

In manual construction of documents, a place holder is in the form of a blank space, an outline, or an identifiable page within a document. It is often extremely important to know the size of the referred to material in advance. By contrast, in electronic document construction, a place holder reserves an indeterminate amount of space and material referred to by the place holder is inserted when resolved; a size for same is determined at that time. Some place holders are resolved in advance and are replaced immediately.

An advantage to prior art implementations of document assembly using referents over manual document assembly, is the ease of use provided to a user. A user need not ensure that referents are resolved prior to use within an electronic document. In fact, other than a referent reference name or indicator, in order to effectively make use of a referent, little need be known regarding the referent.

Streams

Figure 2:
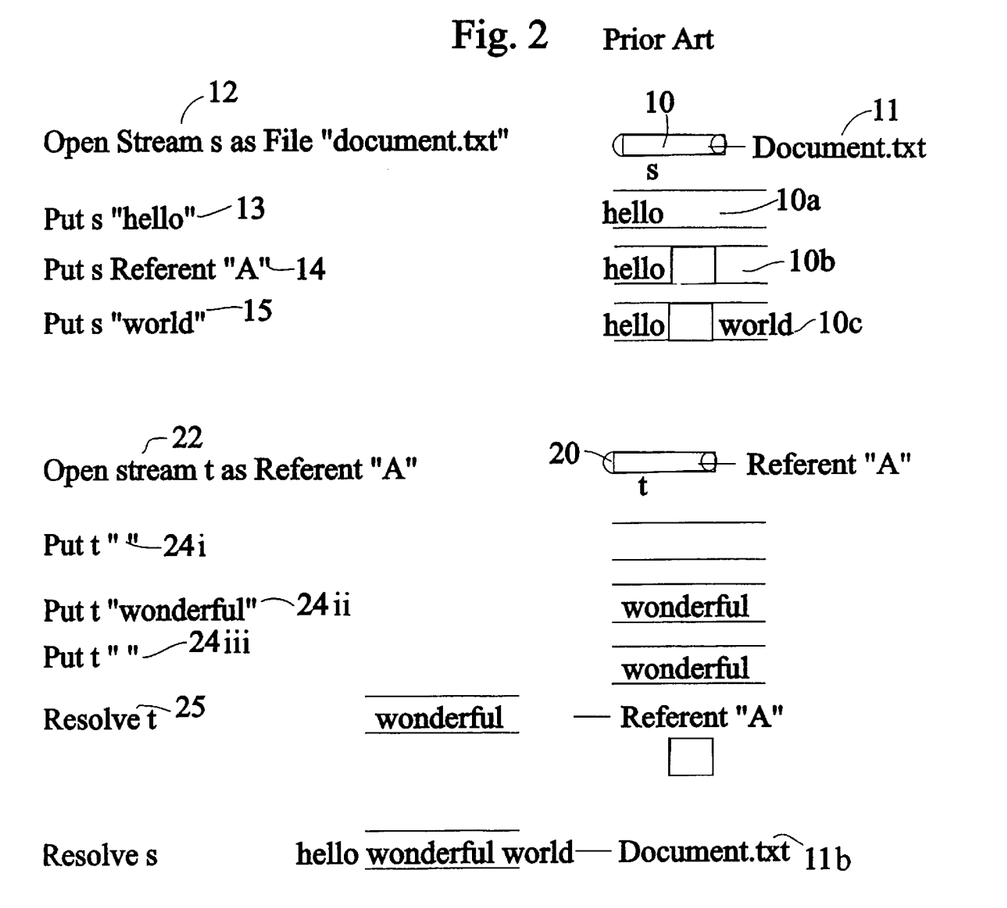
FIG. 2 is a simplified block diagram of a method of document construction according to the prior art.
Figure 3:
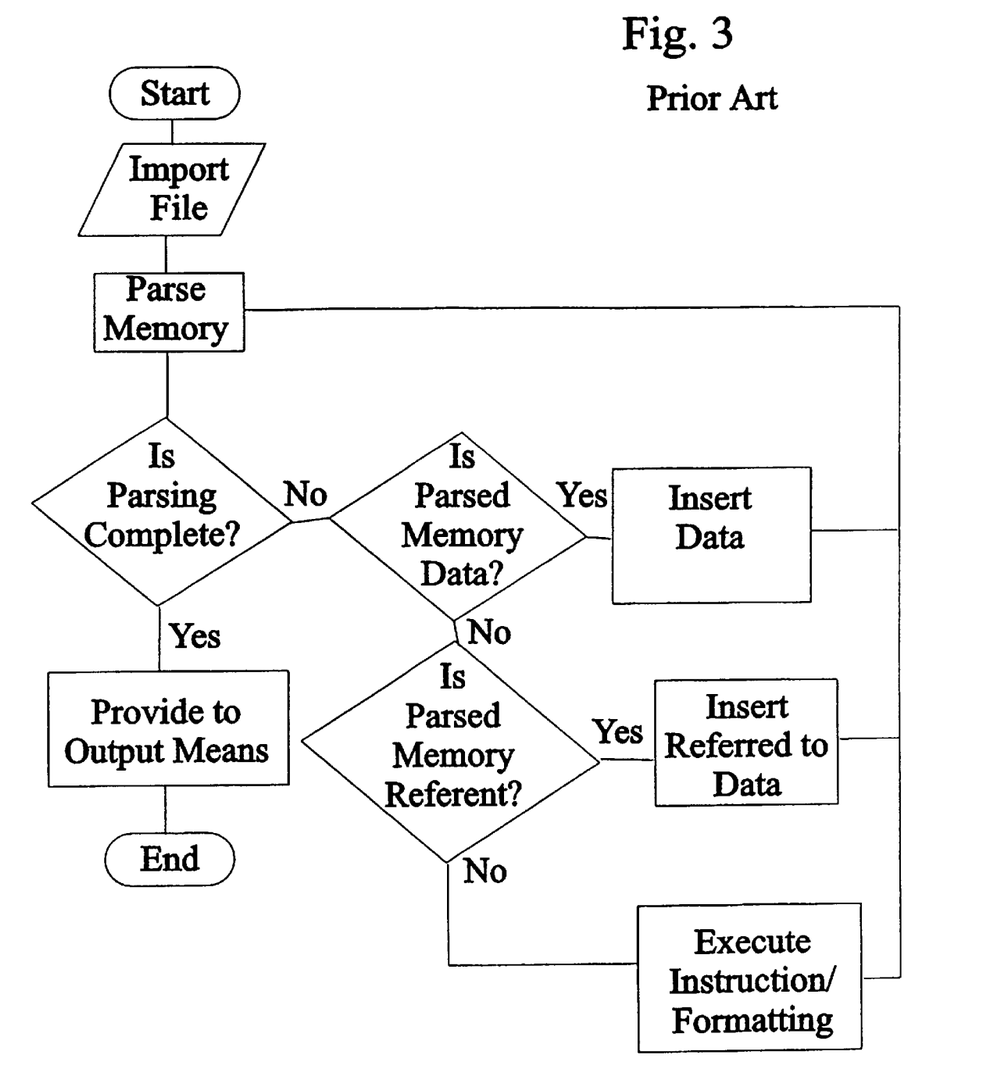
FIG. 3 is a flow diagram of a method of document construction according to the prior art.

Referring to FIG. 2, a stream 10 is shown. The stream 10 is manipulated through instructions, and a series of instructions are shown creating and manipulating the stream to construct an electronic text document, document.txt, 11. The stream 10 is a path through which information flows serially. In general, streams do not maintain information; they act as an information conduit. To write data to the file 11, an instruction 12 opening the stream 10 with an input reference s and for output to the file 11 is executed. The instruction 13 causes data to be written into the stream 10 and the stream with the newly inserted data is shown at 10a. Processing of the stream 10 at this point, would result in the data within the stream and shown as 10a being stored in the file 11. The stream acts as a logical smart buffer for data, thereby allowing a transfer of information or data independent of a recipient device or structure. The data written to the stream is processed therein prior to output to a device or structure and thereby is capable of numerous formatting and protocol changes. Optionally the output device or structure is a referent, a buffer, an external function, a file, or another stream.

The instruction 14 results in the placement of a referent "A" into the stream 10. The resulting stream contents are shown as 10b. The instruction 15 results in the placement of further data into the stream 10. The resulting stream contents are shown as 10c. An attempt to resolve the stream 10 at this time has no result as the referent "A" is not yet resolved. Alternatively, such an attempt results in an error condition. In order to resolve the referent "A," a second stream 20 is associated therewith in instruction 22, data is inserted into the second stream 20 as a result of any number of instructions 24, and the second stream 20 is resolved, for example, in response to instruction 25. Resolving the second stream 20 results in a determination of the contents of second stream 20. The referent "A" is associated with the contents of second stream 20. Resolving the stream 10, now results in the construction of the electronic document 11b containing the contents of second stream 20 inserted into stream 10 in place of the referent "A."

Figure 4:
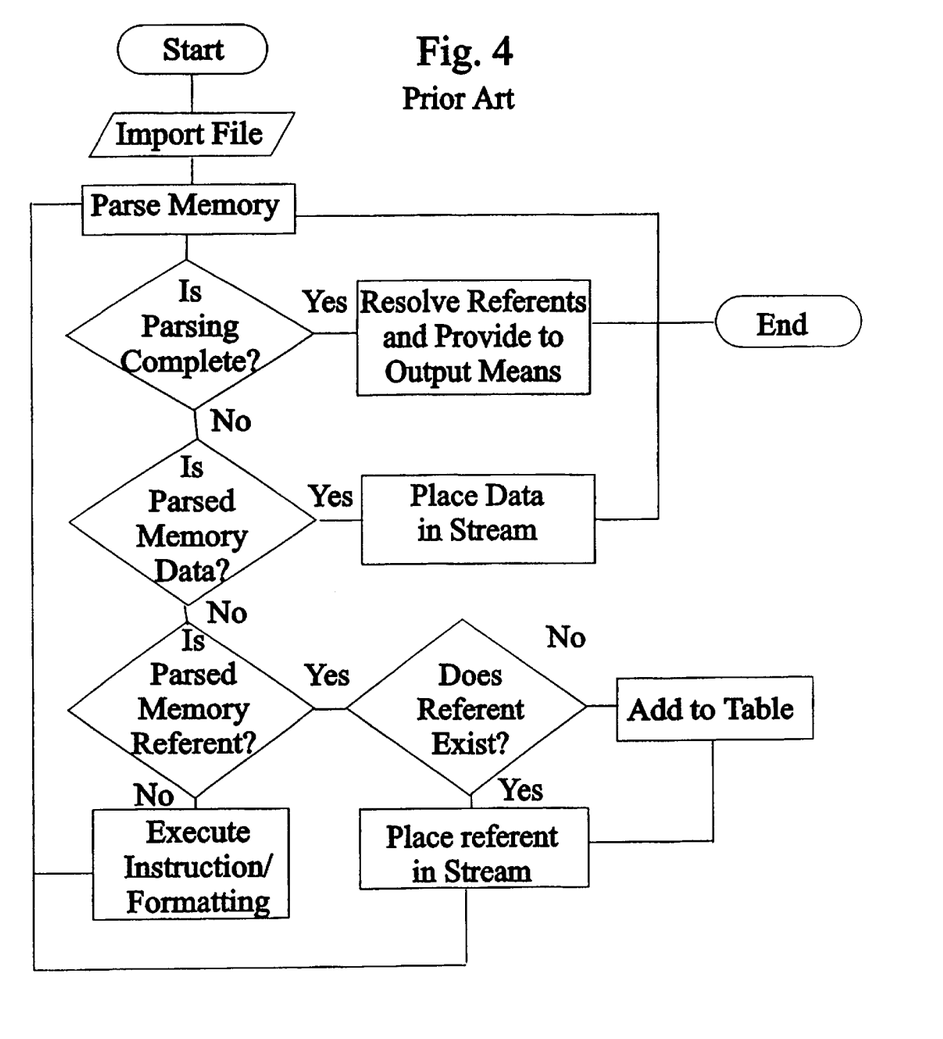
FIG. 4 is a flow diagram of a method of document construction according to the prior art.

Referring to FIG. 4, a flow diagram of a method according to the prior art is shown. The method is embodied in a software application for Standard Generalized Mark-up Language (SGML) and document processing called Omnimark™ Version 3. Programs, such as Omnimark™, provide a host of document assembly and translation features. Within a document, referents, as described above, are employed to hold a place for other information from other files, system data, calculations, other programs, a main file, etc. The flexibility of the referents enables their use in many applications.

In the flow chart of FIG. 4, an initial configuration includes a stream defined for document construction and a referent table constructed and defined to allow use of referents within the stream. A document is constructed by first importing data from a file into the stream. The data is parsed to distinguish between commands in the form of formatting information and calculations, content in the form of graphics and text, and referents. When parsed data is a referent within the stream, the referent is entered into the referent table. The referent table contains a list of all referents within a stream, referent locations, referent contents, and referent status in the form of resolved or unresolved. The referent is not replaced until the final stage of document construction. Alternatively, when the referent is resolved, the information to which the referent refers is inserted within the stream; when the referent is unresolved, the referent remains within the stream and actions performed on the referent affect the referent table. Alternatively, when the referent is resolved, every known instance of the referent is replaced with the information to which the referent refers.

When the data is content, the data is inserted within the stream unchanged. In constructing the electronic document, the data is retrieved, optionally reformatted, and then provided to an output means associated with the stream.

When the data is formatting information, the stream contents are formatted. The formatting is in the form of a transformation and may include such formatting as bolding, language translation, spell checking, addition of dynamic links, and so forth. The term formatting as used throughout this specification is intended to have the above definition. Alternatively, the electronic document is provided to a formatting means prior to being provided to an output means. Such a system is very useful; unfortunately, the referents used therein rely on known file formats and previously constructed files, streams, or information. Further, the referents are always unique in nature and effecting a referent for one subsystem, effect all similarly identified referents.

According to the present invention, a method and architecture are described for nesting referents and varying referent scopes in order to seamlessly produce electronic documents without advance construction of files, sections, or streams. An advantage of such a method is that each department, for example in a corporation or government, produces their own electronic publications by querying their databases, compiling their information, etc. as well as drawing on information within other groups or departments that has been stored there in a "raw" format and a final document construction process reflects up-to-the-minute information from each of these data bases.

Figure 5:
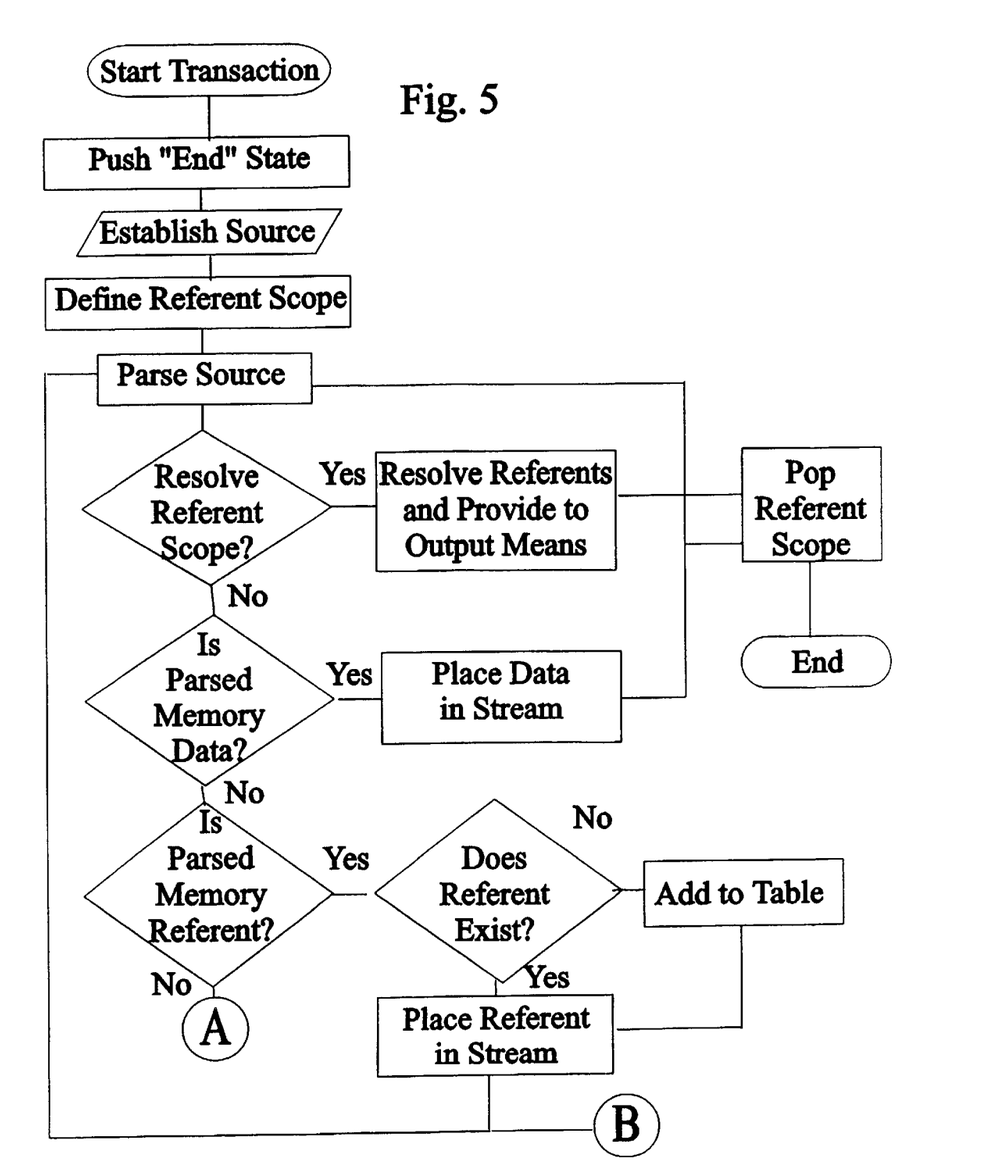
FIGS. 5 and 5b are a flow diagram of a method of document construction according to the invention.
Figure 5B:
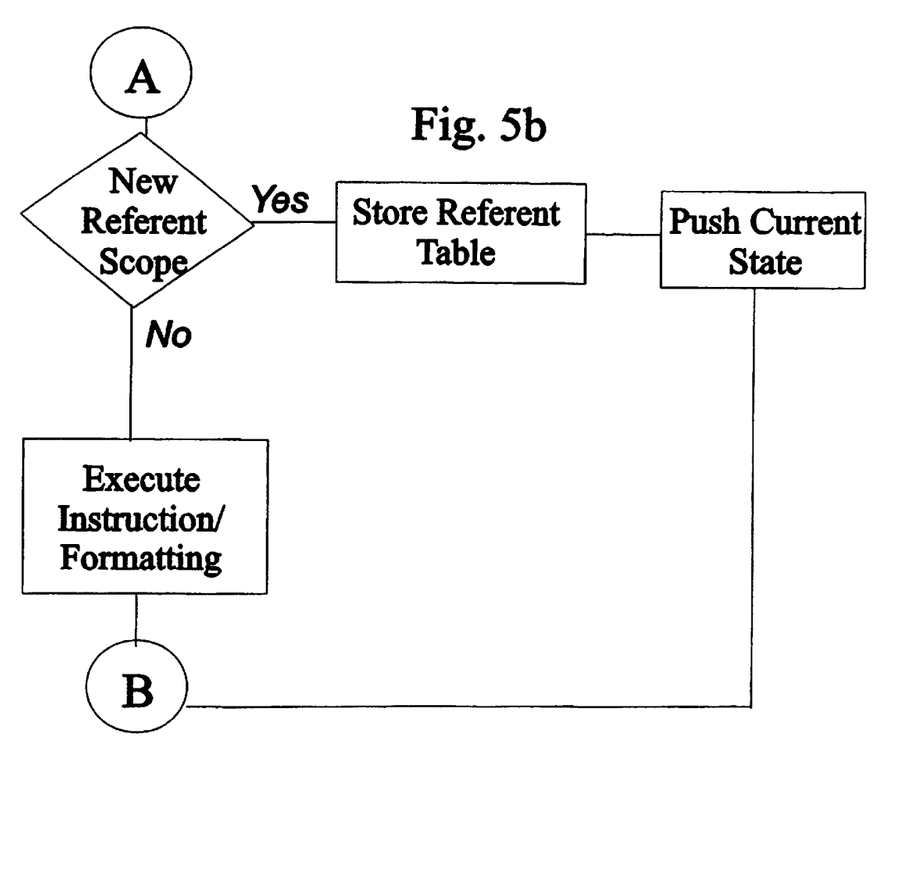

Referring to FIGS. 5 and 5b, a flow diagram of a method according to the present invention is shown in which a document is constructed in dependence upon the work of several independent groups in the form of corporate divisions, research labs, artists, writers, editors, etc. The document is an amalgamation of the work of each group with, advantageously, some common elements and formatting. The flow diagram of FIGS. 5 and 5b incorporates live data from each group into the finished document and allows a new updated document to be constructed as desired.

A document construction process is described below with reference to a stack. It will be apparent to those of skill in the art that other forms of nesting may be employed such as iteration. A transaction begins and a final state is placed onto a stack. This final state is a state the process should arrive at once a last referent scope within the transaction is resolved. In this fashion, a final formatting station or transformation is applied to the stream of data prior to provision of the stream of data to an output means. Alternatively, the final state halts execution of the process and all processing is performed prior to that time. Further alternatively, the stack is not provided with a final state and upon popping the stack, the process checks for an empty stack and when the stack is in fact empty, exits the parsing loop shown in FIGS. 5 and 5b.

The document is constructed by first importing data from a data source. Preferably, the data source is a stream of data drawing from an input means in the form of a file, buffer, stream, transaction, communication, or a database; this facilitates the use of various input means as data from the input means is formatted or transformed into data appropriate to the document construction process. Alternatively, another form of logical input means is used. Further alternatively, a physical input means is used. For example, a source stream of data connected to a file allows data to be read from the file and placed into a stream of data.

The data is parsed to distinguish commands such as formatting information and calculations, content in the form of graphics and text, and referents. When the referent scope is resolved, the information to which the referents within the scope refer is inserted within the stream of data in place of the referents. The stream of data associated with the referent scope is then provided to an output means. The output means is another stream of data, buffer, file, printed document, another process, another transaction, a communication channel, or any other suitable output means. Alternatively, a referent scope is not associated with a stream of data and the referents are resolved within the streams of data in which they are located. The stream of data, in this alternative situation, is not provided to an output means until the transaction is complete. Alternatively, the stream of data is provided to the output means once all referents within the stream of data are resolved. Once referent resolution for a referent scope is complete, the stack is popped. This results in either a return to a previous referent scope and to parsing the source stream of data or, alternatively, when no more previous referent scopes exist, an end state during which final processing is applied prior to document collation and output.

Alternatively, a less structured form of referent nesting allowing for multiple referent tables and multiple referent scopes is used. Each referent is given a scope and identified by scope. Referents are defined and used within the scope or by reference to their scope and referent name. Referent use is also limited to within a referent scope or, alternatively, to referents are used independent of scope but are always indicated by scope and referent in order to ensure uniqueness. All referents are resolved within a given scope at a same time. Using an unstructured form of referent nesting may require a plurality of resolution passes in order to resolve all referents within a document.

When the data is content, the data is left unchanged. In constructing the electronic document, the data is retrieved, optionally reformatted, and then provided to an output means associated with the stream. When the data is formatting information, the stream contents are formatted. Alternatively, the electronic document is provided to a formatting means prior to being provided to an output means. Alternatively, all data within the source stream of data is formatted prior to parsing. As explained above, formatting is defined as transformed, altered, filtered, translated, or processed.

When parsed data is a referent within the stream, the referent is entered into a current referent table The referent table contains a list of all referents within a given referent scope. For each referent, a referent location, a referent content, and a referent status in the form of resolved or unresolved is stored. The table is updated to reflect current status and usage information for each referent within a referent scope. In an embodiment, a referent scope is self contained; all referents created within the scope are resolved within the scope. Creation of a referent scope results in a new referent table having no entries and to which new referents will be added upon referent creation. Within the referent scope, all referents are local to the referent table associated with the scope. In a further embodiment, within a referent scope referents are local and referents of parent scopes are also accessible; parent scopes are those scopes within which a current referent scope is nested. In yet another embodiment, referents from any scope are accessible from within any scope. This is accomplished through referent nomenclature. Alternatively, this is accomplished through specific commands in the form of a copy stream command, a cut stream command, or a paste stream command.

When a new referent scope is created, the current referent table is stored for later retrieval. A new referent table is constructed and becomes a current referent table. Referents within the current referent scope are entered into the current referent table. When the referent scope is resolved, the information to which the referents within the scope refer is inserted within the stream in place of the referents and the current referent table is discarded. The previous current referent table is retrieved from storage and becomes the current referent table. In this fashion, referent scopes are nested one within another.

Queuing Area

Figure 6:
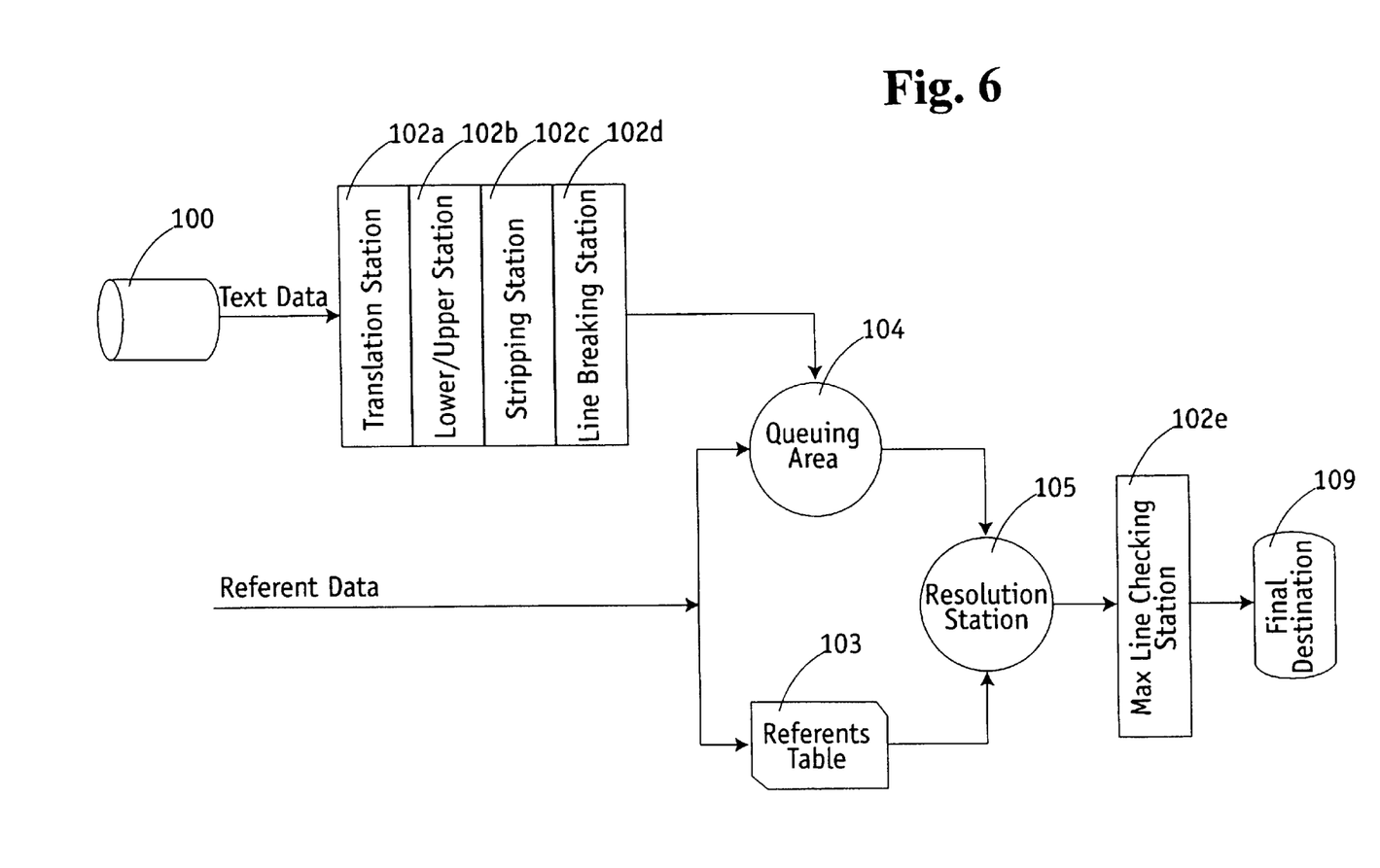
FIG. 6 is a simplified diagram of a stream and stream processing stations.

In order to hold stream contents pending resolution of referents, a queuing area is established. In the queuing area are stored streams with unresolved referents. The use of referent tables, allows the analysis of streams to determine a necessary order of referent resolution. Preferably, streams are queued in an order beneficial to referent resolution absent errors and with a minimum number of resolution passes. Referring to FIG. 6, a simplified diagram of a stream 100 and stream processing stations is shown. The stream passes through a plurality of processing stations 102a, 102b, 102c, and 102d prior to being stored within the queuing area 104. Different streams within a referent scope are all stored within a queuing area 104 and associated with a referent table 103 for the referent scope. Once an instruction initiates resolution of the referent scope, the streams are passed from the queuing area 104 to a resolution station 105. Referent values are determined in dependence upon the referent table 103 and replace any place holders within the streams. At a final processing station 102e, the resolved stream is formatted prior to reaching a final destination 109. At the final processing station 102e, page formatting is applied and, optionally, predetermined formatting is altered to ensure a common look to a constructed document.

A queuing area 104 and referent table 103 are created for each referent scope. This allows for nested referents and provides an architecture supporting users with a minimum of knowledge regarding document portions for inclusion in a final document. Alternatively, a plurality of referent tables and streams within a plurality of referent scopes are all stored in a same queuing area and are prioritised dynamically in dependence upon the referent tables to determine an order for resolution. Further alternatively, a referent database is constructed in dependence upon each referent scope and a referent table associated with each referent scope, and the referent database is used to enable scheduling of referent scope resolution.

In an embodiment, a queuing area is created for each stream. The queuing area maintains information on referent scopes and their beginnings and endings. This allows for partial resolution of information within a queuing area. One implementation allowing a single queuing area for each stream uses a tiered queuing area. Each tier is associated with a referent scope. The tiers are stacked similar to stacks in computer memory. Creation of a new referent scope results in a new tier of a queuing area being pushed onto the stack associated with a stream. The resolution of the referent scope, allows the queuing area to be resolved, the data contained in the queuing area to be provided to appropriate destinations, and the tier to be popped from the stack. As referent scopes are nested in a structured fashion, the upper most tier on the stack is always the current referent scope for a given stream and must be resolved prior to resolving tiers located lower in the stack. In a further embodiment, a queuing area is created for each referent scope. In yet a further embodiment, a single queuing area is created for an entire document.

The advantages provided by using nested referents are numerous. First, a new referent scope initiated at the start of each document construction process allows for independent document creation and construction. When a document contains a plurality of smaller documents therein, each smaller document is constructed within its own referent scope and therefore, does not affect other smaller documents, the larger document or a document construction process. Similarly named referents within different scopes do not conflict. Therefore, communications between different groups compiling different portions of the larger document in respect of referent names are not necessary.

Figure 7:
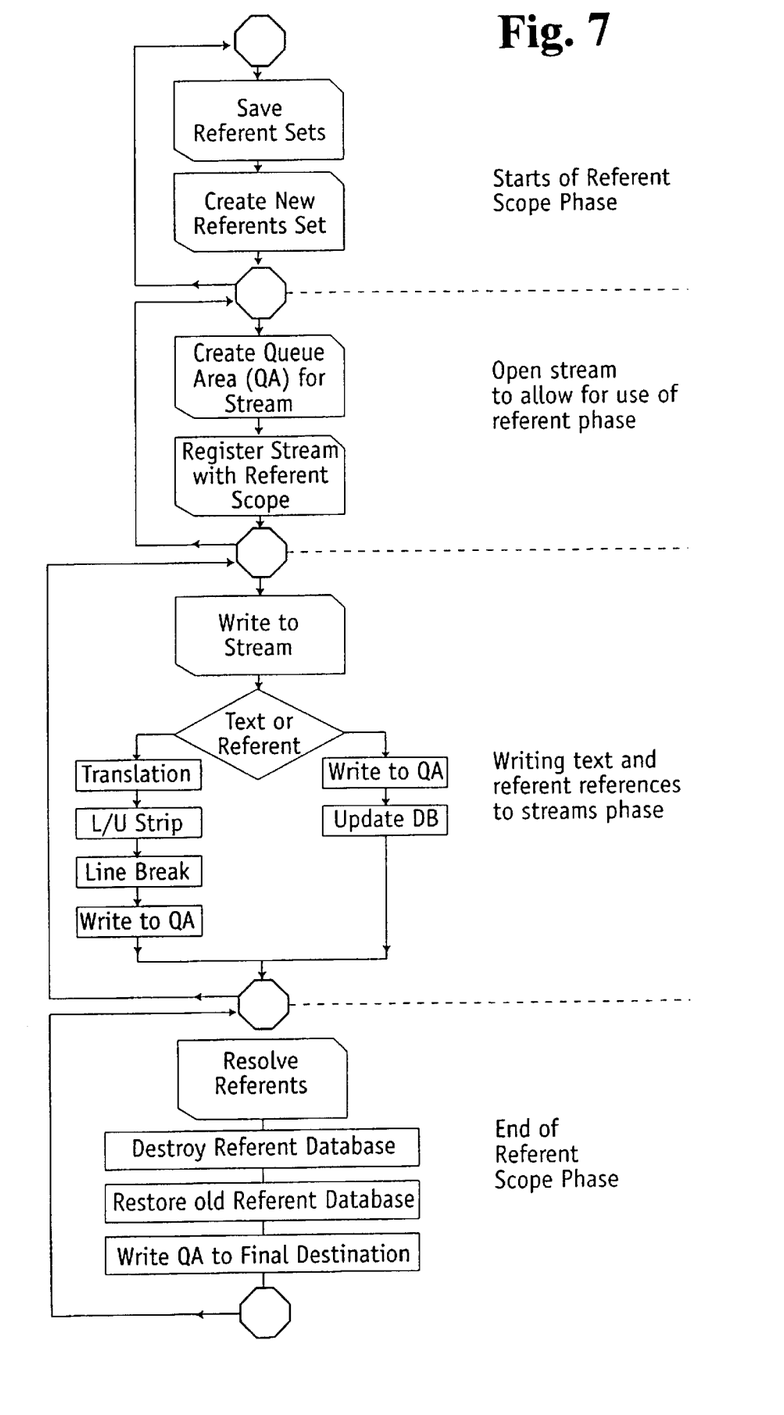
FIG. 7 is a simplified flow diagram of a method of document construction according to the invention; and, FIG. 8 is a simplified diagram of a network for which a method according to the present invention is implemented.

Referring to FIG. 7, a simplified flow diagram of referent processing is shown. In a first stage of referent processing, a new referent scope is created. Existing referent scopes are stored. Alternatively, only a current active referent scope is stored. A new referent table is constructed for the new referent scope. In a second stage, a queuing area is created for the stream and within the referent scope. Alternatively, a same queuing area is used. Further alternatively, a new stream is created for the new referent scope transparent to the user. The queuing area is registered within the referent scope for use in resolution thereof.

In a third stage, referents are defined and the stream within the current referent scope is available for use. When data is written to the stream, it is processed through a plurality of processing stations as shown in FIG. 6. When a referent is written to the stream, the referent is noted in the queuing area and in the referent table or database. This stage continues until the referent scope is resolved. During the resolution stage, referents are resolved by replacing referents with referred to data. When the data is text, it also passes through the processing stations shown in FIG. 6. Alternatively, data resulting from referent resolution is not processed. Once all referents have been replaced, the referent table or database is erased. Alternatively, the referent table is cleared for further use.

A previous referent table or database is loaded from storage and becomes a current referent database. The queuing area is transferred from a stream within the queuing area to a destination associated with the stream. Examples of destinations include files, data structures, communications means, or other streams. The queuing area is then erased. Alternatively, the queuing area remains for potential future use.

Figure 8:
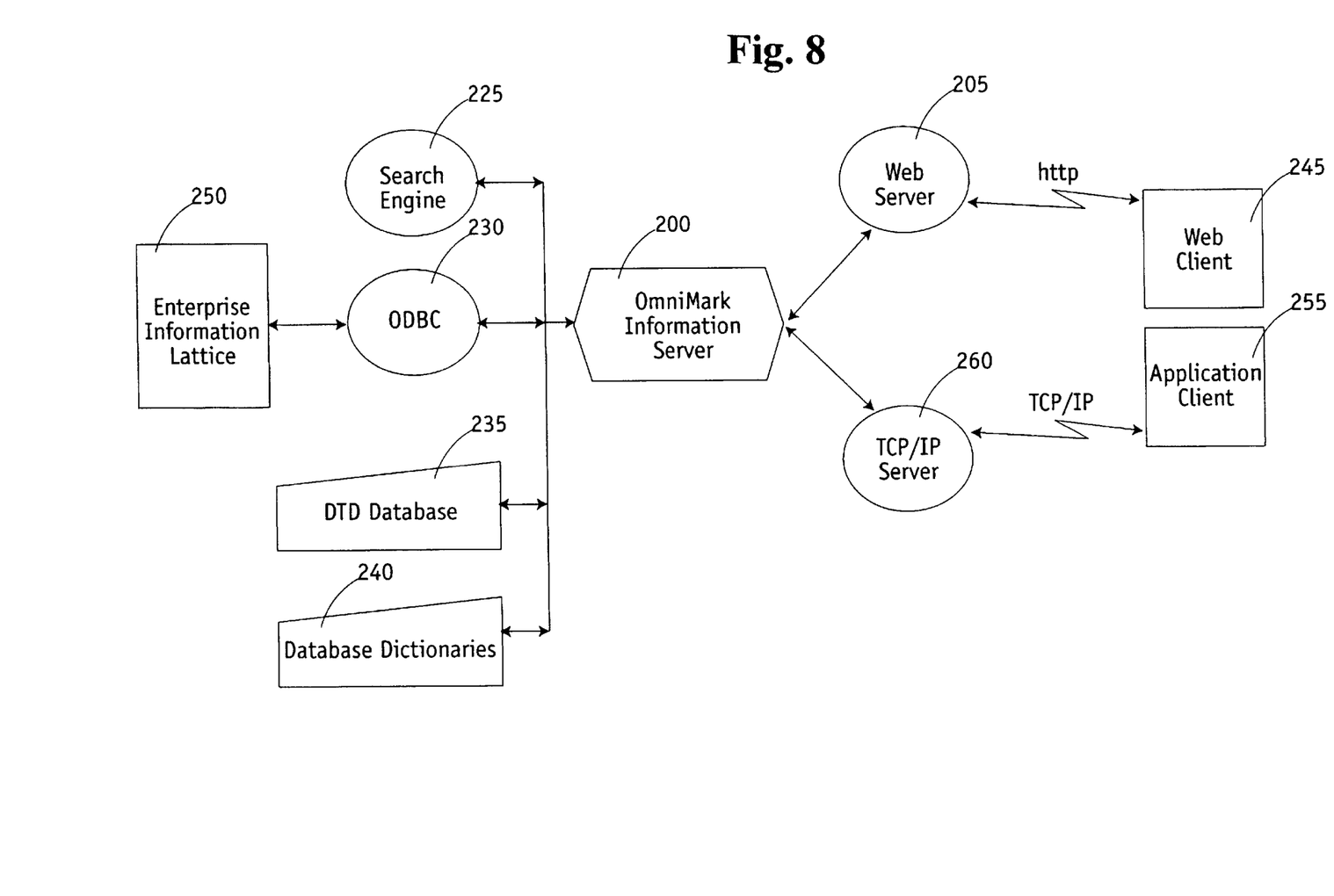

Referring to FIG. 8, an application of this technology to internet based electronic publishing is shown. A server 200 executing software embodying a method according to this invention receives a request from a World Wide Web (WWW) server 205 for information. The information is linked to a WWW address supplied by a WWW client 245. Alternatively, the request is a request in a predetermined format. The server 200 creates a stream and associates it with the request. The stream is then used as a conduit to the WWW from files and other streams containing data in response to the request. Files are searched using a search engine 225 and standard database technologies such as ODBC 230, DTD 235, and dictionaries 240. Once searching is complete, information within the Enterprise information lattice 250 and relating to the request in a predetermined fashion, is provided to the stream. The information passes through several data processing stations and referents are identified. The identified referents are entered into referent tables as described above. Once retrieved information is within the streams, the referents are resolved and the requested information is provided in a format compatible with the requesting WWW client 245. Alternatively, the format is compatible with the WWW server 205. Further alternatively, the format is in a standard mark-up language.

Also shown in FIG. 8 is an application client 255 for communication with the information server 200. The communication is performed using a standard protocol in the form of TCP/IP. Alternatively, other protocols are used. Optionally, further communications media, protocols, servers, and clients may be used with the information server 200.

Within data provided to the stream referents may refer to files, data, or to WWW addresses and publicly available data. A request from a WWW client could, for example, cause a stock broker's server to search for a particular stock portfolio stored within a database and stock related tips currently on file for that individual or for stocks within the portfolio, search the WWW for stock prices of stocks within the portfolio, search the WWW for values of mutual funds and other investments within the portfolio, and generate a document based on predetermined preferences and the results of each search. The document, preferably, is an HTML document and is transmitted via the internet to the WWW client for display.

Further, a broker may use the document generation software to generate an up to date file of all current clients and their portfolio values by calling the web page generation tool for each client. The firm may generate an electronic document of the portfolios they manage sorted and assembled in a variety of fashions by calling each brokers electronic document generator. This of course is possible for each level of an organisation or of a document.

Using streams in the document construction process allows document construction and referent resolution independent of the output medium. A single document construction method and server executing the method are used for a variety of clients; a final processing station converts a constructed document into an appropriate format for a given client. Alternatively, a stream, once associated, with a client, is resolved in a fashion specific to the client.

In order to support transaction based document construction, referents within documents constructed during a transaction are resolved during the transaction. A preferred method of accomplishing this, or ensuring that this is so, involves referent scopes. A transaction is a referent scope. Upon completion of the transactions, all referents within the scope and nested scopes are resolved. Referents without definitions result in a predetermined action such as an error, user notification, or no action. Further, referent scopes allow document construction to be segmented for multiprocessor parsing and resolution of differing referent scopes. Using referent scopes, small portions of larger documents are accessible in shorter times and without generating entire documents.

For applications such as HTML document construction for the WWW, it is impractical to generate and transmit large documents due to communication times and network traffic limitations. Using referent scopes, a single large document is accessible as a series of smaller documents each within a single referent scope. Links between documents are referenced to the information server 200 in order to allow document construction of linked documents when requested. For example, a table of contents is generated and transmitted to a client. An HTML link is associated with each content listed, and the associated link is stored in the information server 200 for later reference. When a WWW client 245 requests a content item, the information server 200 generates appropriate content pages within a referent scope, resolves the referent scope, and transmits the resulting stream to the WWW client 245. Optionally, a WWW client provides preferences to the server with regards to format, size, and content of requested documents. This information is incorporated within the document processing to enable sufficient information for a particular WWW client to be assembled and transmitted.

Using the method according to this invention, referents can be nested. Streams referred to by referents can themselves contain other referents. It is preferable and required in some implementations, that a referent not be nested within itself—a referent should not refer to data containing the same referent. Further, according to the present invention, referent support is implemented within streams, files, transactions, communications, requests, data structures, buffers, etc. Referents located within any of these structures are parsed according to the invention, and resolved in a determined fashion.

A further feature implemented according to the present invention uses referents without a referent table entry. These referents, termed silent referents, often require more processing time but less memory. When a referent is used as a place holder that is sometimes subject to inserted information in the form of characters or data, but is likely to resolve with its default value, silent referents are a useful tool. For example, in placing page breaks intelligently within a document, a silent referent is placed before each content item title with a default value of a page break character. Upon processing, when a content item title is located above a predetermined point on a page, the referent is given a value corresponding to a null character. Otherwise, the referent is left as the default page break character. For a large document, the number of theses referents is large and requires memory within referent tables. Using silent referents, alleviates the memory requirements; when many of the referents are set to non-default values, using silent referents results in performance degradation.

In copying streams or buffers from a source to a destination, referents are copied. Referents are copied either within a new referent scope, thereby creating a new referent scope within the destination stream or alternatively, referents are copied into an existing referent scope in the destination stream. Alternatively, referents are copied but remain associated with the referent scope of the source stream. Further alternatively, referents are resolved prior to copying the buffer or the stream.

A formal description of an implementation of a method according to the present invention is available for public inspection in the file of U.S. patent application Ser. No. 08/762,221. The formal specification is in a standard notation that is known to those of skill in the art. A reference providing detailed information on use and understanding of the notation is Spivey, J. M.; *The Z Notation—A Reference Manual,* 2nd Edition; Prentice Hall Series in Coputer Science; C. A. R. Hoar (Ed.); ISBN 0-13-978529-9. The formal specification forms part of this specification.

Numerous other embodiments of the invention may be envisioned without departing from the scope of the invention.

What we claim is:

1. A document construction system including files containing data and instructions, wherein data forms at least a logical stream of data and wherein logical streams of data ate provided to output means comprising:

means for providing a plurality of referents wherein at least a referent refers to a logical stream of data;

means for providing a plurality of different referent scopes with which referents are associated and used and outside of which referents within a scope are inaccessible;

means for inserting at least a referent into the logical stream of data and within a referent scope from the plurality of referent scopes;

means for resolving logical streams of data referred to by referents within a referent scope, wherein resolving of a referent scope from the plurality of referent scopes results in an unresolved logical stream of data absent an error condition; and means for providing to an output means a resolved logical stream of data, the resolved logical stream of data forming a constructed document.

2. A document construction system as defined in claim 1 further comprising means for queuing parts of a logical stream related to a referent scopes.

3. A document construction system as defined in claim 2 further comprising means for resolving a plurality of parts of a logical stream related to different referent scopes.

4. A document construction system as defined in claim 2 further comprising means for determining an order in which different referent scopes from the plurality of referent scopes are to be resolved.

5. A method of document construction comprising:

providing a plurality of logical streams of data;

providing a plurality of referents wherein a referent refers to a logical stream of data from the plurality of logical streams of data;

providing a plurality of different referent scopes with which referents are associated, within which referents within said scope are used and outside of which referents within said scope are inaccessible;

inserting at least a referent into a logical stream of data from the plurality of logical streams of data and within a referent scope from the plurality of different referent scopes; and resolving logical streams of data referred to by referents within a referent scope, wherein resolving of at least a logical stream or data results in an unresolved logical stream of data absent an error condition.

6. A method of document construction as defined in claim 5 further comprising the step of providing a queuing area associated with a logical stream of data and with a referent scope for queuing information inserted into the logical stream of data pending resolution.

7. A method of document construction as defined in claim 5 further comprising the step of providing a queuing area associated with a single logical stream of data and for queuing information inserted into the logical stream of data pending resolution.

8. A method of document construction as defined in claim 5 further comprising the step of providing a queuing area associated with a single logical stream of data and with a single referent scope for queuing information inserted into the logical stream of data and for queuing information inserted into logical streams of data referred to by referents within the single referent scope pending resolution.

9. A method of document construction as defined in claim 5 further comprising the step of inserting data in the form of text into the logical stream of data.

10. A method of document construction as defined in claim 9 further comprising the step of formatting the data within the logical stream of data prior to resolution thereof.

11. A method of document construction as defined in claim 9 further comprising the step of transforming the data within the logical stream of data prior to resolution thereof.

12. A method of document construction as defined in claim 5 wherein the plurality of referent scopes are provided, wherein a referent scope falls entirely within another referent scope or entirely outside another referent scope from the plurality of referent scopes.

13. A document construction system including files containing data and instructions, wherein data forms at least a logical stream of data and wherein logical streams of data are provided to output means comprising:

means for providing a plurality of referents wherein at least a referent refers to a logical stream of data;

means for providing a plurality of different temporal referent scopes with which referents are associated and used and outside of which referents within a temporal referent scope are inaccessible, the temporal referent scopes defining a relative temporal order between resolution of two different temporal scopes;

means for inserting at least a referent into the logical stream of data and within a temporal referent scope from the plurality of temporal referent scopes;

means for resolving logical streams of data referred to by referents within a temporal referent scope in the defined temporal order; and, means for providing to an output means a resolved logical stream of data, the resolved logical stream of data forming a constructed document.

* * * * *